United States Patent [19]

Eisenbeisz

[11] Patent Number: 5,090,302

[45] Date of Patent: Feb. 25, 1992

[54] APPARATUS AND PROCESS FOR REDUCING HEAT GAIN AND LOSS FROM WINDOWS

[76] Inventor: John N. Eisenbeisz, 2023-C Round Top Dr., Honolulu, Hi. 96822

[21] Appl. No.: 510,002

[22] Filed: Apr. 11, 1990

[51] Int. Cl.⁵ .............................................. E06B 7/02
[52] U.S. Cl. ...................................... 454/205; 52/171; 454/236
[58] Field of Search .................. 98/94.1, 88.1, 90, 95; 52/171

[56] References Cited

U.S. PATENT DOCUMENTS

| | | | |
|---|---|---|---|
| 2,672,735 | 3/1954 | Fusselman | 98/90 X |
| 3,255,688 | 6/1966 | Iwata | 98/95 |
| 4,382,436 | 5/1983 | Hager | |
| 4,534,335 | 8/1985 | Rice | |
| 4,577,619 | 3/1986 | Howe, Jr. | |
| 4,641,466 | 2/1987 | Raninen et al. | |
| 4,796,519 | 1/1989 | Kondo et al. | 98/88.1 X |

FOREIGN PATENT DOCUMENTS

| | | | |
|---|---|---|---|
| 883523 | 7/1953 | Fed. Rep. of Germany | 98/90 |
| 2528473 | 12/1983 | France | 52/171 |
| 279039 | 11/1988 | Japan | 98/90 |
| 11970 | 10/1906 | United Kingdom | 98/90 |

*Primary Examiner*—Harold Joyce
*Attorney, Agent, or Firm*—Martin E. Hsia

[57] ABSTRACT

A window for reducing heat gain or loss through windows by ventilating interior air at interior temperatures over the exterior of the window in a controlled circulation pattern using nozzle tubes with a plurality of transversely disposed air jet apertures mounted in the jambs and mullions. Interior air is ventilated by a fan or compressor into air supply tubing that is attached to the nozzle tubes. Preferably, the amount of air ventilated is less than or equal to the minimum amount of ventilation required under ventilation standards.

16 Claims, 7 Drawing Sheets

APPARATUS AND PROCESS FOR REDUCING HEAT GAIN AND LOSS FROM WINDOWS

BACKGROUND OF THE INVENTION

This invention relates to an apparatus and process for reducing heat gain and loss through windows and other fenestrations in the heating and cooling of buildings.

Almost half of the energy used in buildings is employed to condition the air. Controlling the temperature, humidity, and quality of the air we breathe is important to our health and comfort. Light is also an important quality to our built environment, and fenestrations provide one or both of those elements. It is through these fenestrations (windows, skylights, and doors) that the majority of energy in a building is gained and lost, usually as heat (as used herein, windows shall include other fenestrations).

In the summer, heat is gained through the glass of a window or the conduction and convection of air passing through an open door. Heat is gained through a window by conduction, radiation, and convection. The ambient air temperature is transmitted through the glass by conduction. Solar radiation is radiated through the glass, and also absorbed and transmitted into the room by convection. In the winter the converse is true; heat is lost through the windows and doors. It is primarily the heat lost and gained through windows due to these exterior temperature influences that can be reduced uniquely with this invention.

Current technology is focused on raising the R value (resistivity) of windows using reflective films, low emissivity coatings, and double and triple glazings that may incorporate chemical dessicants or gases between the panes of glass. Costs are prohibitive for many applications because of specialized technology and complexity.

Window units designed with multiple panes were developed from the study of the effects of draperies on windows. It was noted that draperies played an important role in solar heat control. It was also noticed that when conditioned air was vented over the interior of a window pane, there was an increase in the cooling load to the room. Further study notes the combined effects of venting conditioned air between the window panes and draperies (American Society of Heating, Refrigerating and Air-Conditioning Engineers, Inc. Handbook).

It is known to vent interior air between the panes of a double pane window assembly to reduce the amount of heat transferred through the assembly.

U.S. Pat. No. 4,382,436 to Hager discloses venting air between two panes in a window.

U.S. Pat. No. 4,577,619 to Howe, Jr. discloses an adjustable shade between two panes and a fan to selectively channel air over the shade and into or out of the building.

U.S. Pat. No. 4,534,335 to Rice discloses a solar heat collector and reflector including a plurality of hollow fins transversely disposed across an open window area and selective direction of the air heated within each fin.

U.S. Pat. No. 4,641,466 to Raninen discloses a double paned window with the interior pane having an electric heating element.

Vented double or multiple paned window assemblies (with or without a shade or collector) are inefficient because solar heat energy is absorbed by more than one element (two panes or one pane and a shade). Thus, absorbed heat must be removed from more than one element. Further, the air is ventilated to the exterior of the building as uncontrolled exhaust; its thermal potential is wasted. Moreover, air between two panes of glass will stagnate and stratify due to buoyancy and thermal variations in the surrounding structure, depending on the location of the air inlet and outlets.

A certain amount of ventilation (currently 5 cubic feet per minute per person) is required under present standards in order to provide adequate ventilation. Recently, concerns about the quality of indoor air have increased interest in ventilation of buildings in order to alleviate "sick building syndrome." However, increased ventilation will increase the load on a building's heating and cooling system because of the increased volume of air that must be conditioned.

It is therefore an object of this invention to provide a simple means to reduce heat gain and loss through windows and other fenestrations.

It is a further object of this invention to provide such a means that utilizes the previously wasted thermal potential of ventilated interior air.

It is a further object to provide such a means that will not unduly increase the volume of air that must be conditioned by a building's heating and cooling systems.

It is a still further object of this invention to provide such a means that can be retro-fitted to existing windows and fenestrations.

SUMMARY OF THE INVENTION

This invention comprises directing ventilated interior air at interior temperatures in a controlled circulation pattern over the exterior of the exterior pane (or single pane) of glass. This utilizes the thermal properties of the interior air necessarily exhausted for adequate ventilation as a pattern of air jets across the exterior surface of the window glass. This ventilating and directing of interior air is preferably accomplished by attaching an elongated nozzle tube having a plurality of aligned transverse air jet apertures spaced along its length to each of the jambs of a window. The air jet apertures are configured to direct air onto the exterior face of the pane. Air supply tubing is attached to one end of each of the nozzle tubes and communicates with the interior. Alternatively, the air supply tubing could be integrally formed with the nozzle tubes. A ventilating means for ventilating air from the interior space into the air supply tubing then ventilates air from the interior space at the interior temperature into the air supply tubing and through the nozzle tubes, where it is directed by the air jet apertures onto the pane to circulate air adjacent to the exterior face. Absorbed solar radiation is thus removed directly to the atmosphere, which efficiently reduces the cooling load.

It is preferred that the maximum rate of ventilating interior air not unduly increase the load on the building's heating and cooling systems, with the optimum operating conditions being determined by the ratio of ventilated window pane area to ventilation requirements for the floor area. Any increase in heat gain or loss through additional ventilation is expected to be more than offset by the reduction of heat gain or loss from ventilating the air on the exterior surface of the window pane in accordance with this invention. Thus, as used herein, the term "ventilating" shall mean a rate of ventilation consistent with accepted standards of adequate ventilation. It is preferred that the ventilation rate be less than or equal to one cubic foot per minute for each square foot of window pane area.

This invention therefore creates a controlled circulation pattern of interior air (at interior temperature) across the exterior face of the glass with nozzles that direct and concentrate the flow of ventilated air, thus reducing the cooling load into the room. The preferred circulation pattern is presently obtained by directing air perpendicularly from each of said jambs towards the other, almost parallel to but towards the exterior face, but other circulation patterns can be employed.

The exterior edges of the jambs are preferably canted towards each other so that the jambs define air deflecting surfaces to resist disruption of the circulation pattern by ambient air movement. If the window has a mullion, the mullions also would be provided with similar air supply tubing and nozzle tubes and the exterior mullion edges also would be canted so that the mullions define air deflecting surfaces.

The flow of ventilated air in this circulating pattern, and the deflecting surfaces at the jambs (and mullions, if present) are expected to create an area with a slightly higher pressure zone than the surrounding ambient air. This is expected to resist the effects of ambient air movement (breezes, wind and gusts) due to shifts of high and low pressure.

Interior air is drawn into the tubing of the assembly with a centrifugal or axial fan or compressor located in the room or placed in the exhaust duct of the HVAC (Heating, Ventilating, and Air-Conditioning) system ("centrifugal fan" shall include any air supply device, fan or compressor designed to maintain the pressure/flow characteristics of the system). Insulation around the tubing and inside the assembly prevents solar radiation from heating the ventilated air before it is distributed across the face of the window by the nozzles. The ventilated air is air that is necessarily exhausted from a building to insure a healthy interior environment. This invention utilizes the unused thermal potential of the ventilated air.

It is preferred that the operation of the centrifugal fan be controlled by a control unit that determines the time of operation, volume of air through the system, and pressure within the system and at the nozzles. The control unit preferably can be electronically or mechanically programmed to function as the coordinating unit in a building system that may have varying requirements at varying locations and times. Preferably, it may be connected to a number of centrifugal fans that supply ventilated air to a number of different locations on a building.

This invention further provides a means for reducing the size and energy usage of HVAC systems and their components, which reduces the initial and energy use costs. The energy required to operate the centrifugal fan unit is a fraction of the energy saved by reducing the cooling load. In many applications, photovoltaic cells could provide enough voltage to operate the unit. Alternatively, the already existing return air fan in the exhaust duct of an "HVAC" system can be used.

This invention also is applicable to situations in which heat energy is lost through windows to colder outside air. The loss can be reduced by ventilating warmer interior air across the exterior face of the glass. The same concepts stated for summer conditions are utilized here for winter conditions.

DETAILED DESCRIPTION OF THE PREFERRED EMBODIMENTS

Figure 1:
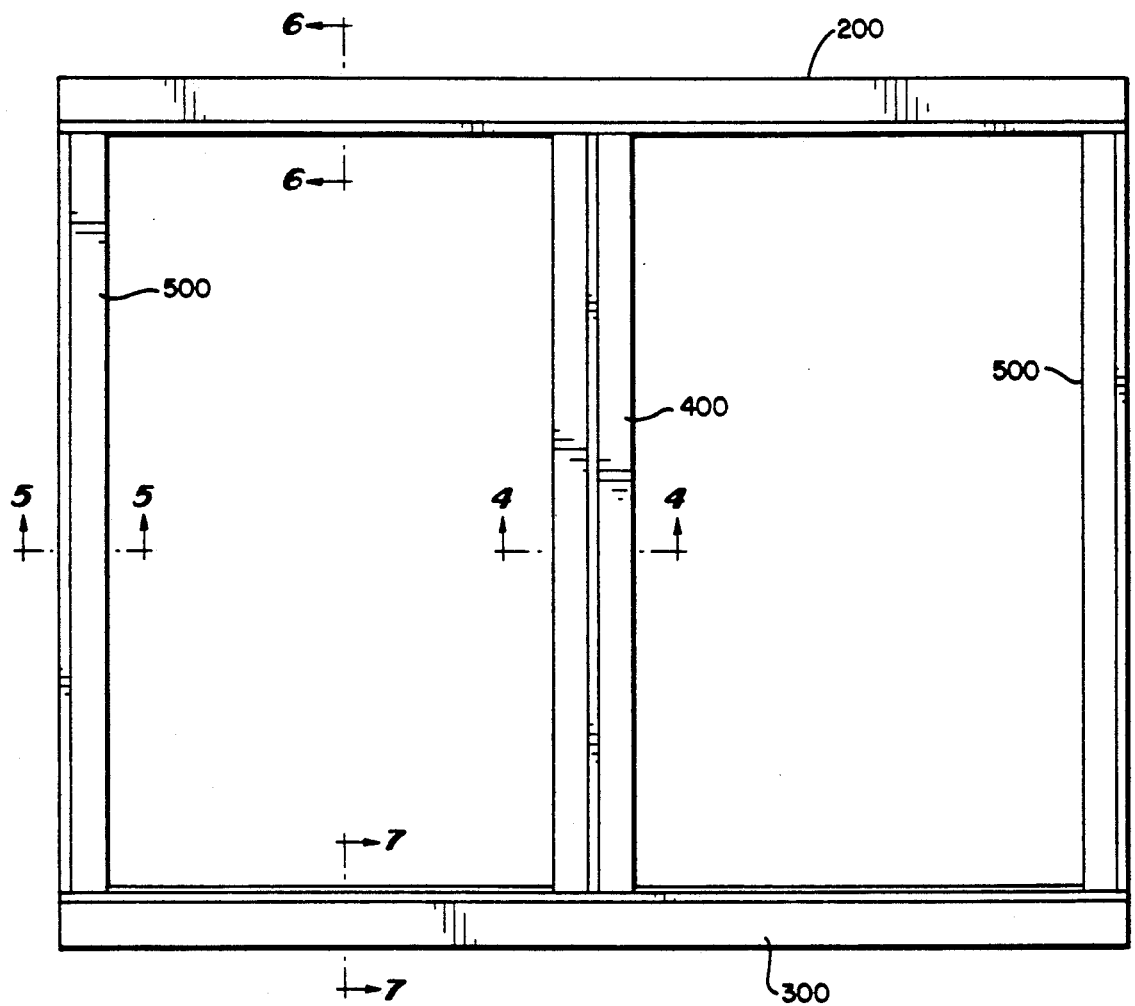
FIG. 1 is an exterior elevational view of a window in accordance with this invention.

Referring to FIG. 1, the complete assembly comprises a head assembly 200, a sill assembly 300, a mullion assembly 400 and two mirror image jamb assemblies 500.

Figure 2:
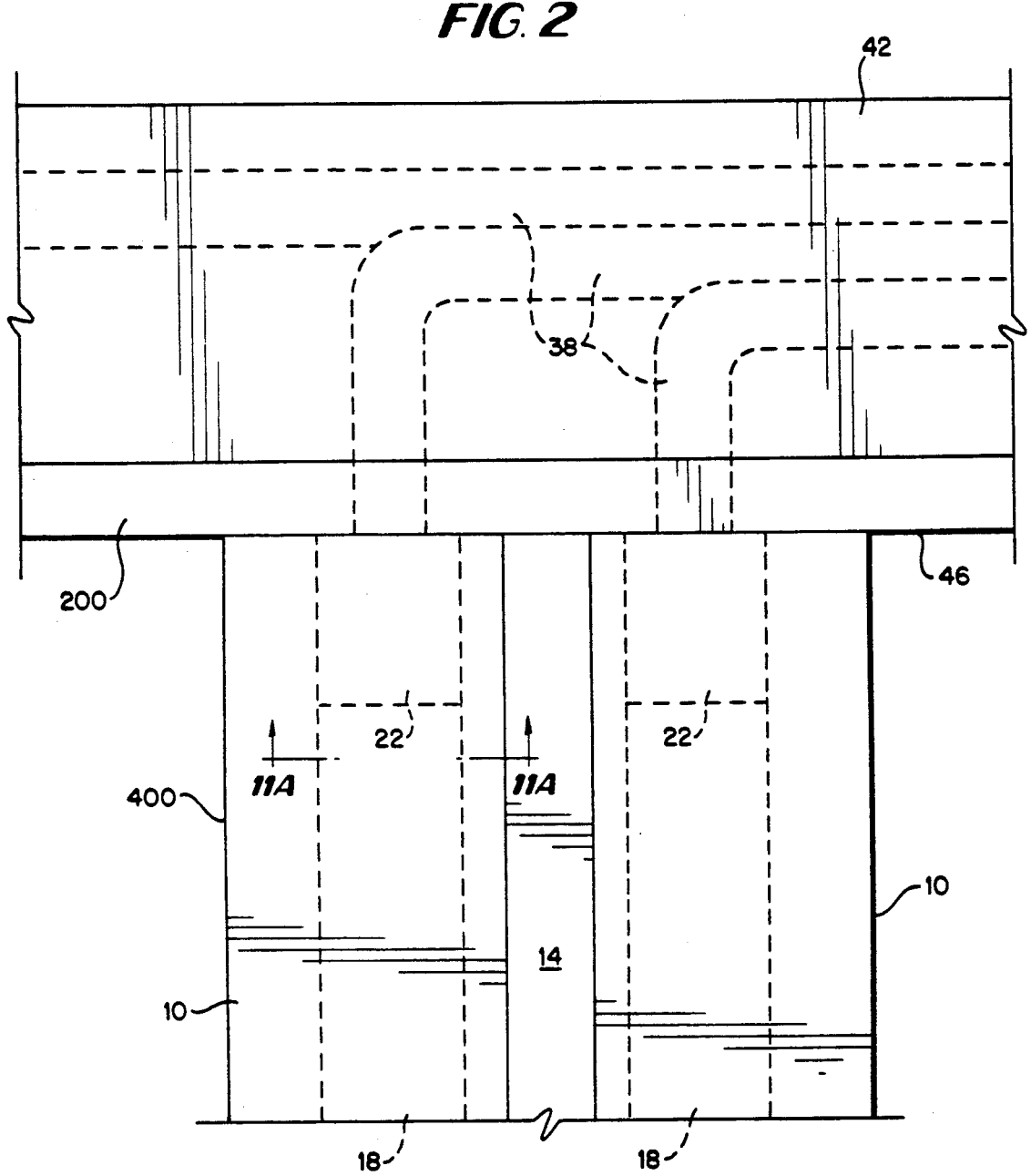
FIG. 2 is an exterior elevational view of the top of the mullion assembly of FIG. 1.

Referring to FIG. 2, the mullion assembly 400 near the head assembly 200 comprises mullion plastic covers 10 that house slotted tubing 18 (shown in FIGS. 4, 5, 9 and 12), self-leveling one-way pressure valves 22 (shown in FIG. 11) and strip nozzles 30 (shown in FIGS. 4, 5, 8, 10 and 12). A mullion synthetic rubber sealing cap 14 closes off a mullion mounting bracket 26 (shown in FIG. 4) from the elements and is necessary for the aesthetics of the assembly.

The head assembly 200 near the mullion assembly 400 comprises a head plastic cover 42, that houses air supply tubing 38 (shown in FIG. 6) and polystyrene insulation 34 (shown in FIGS. 4, 5, 6, and 12). A head synthetic rubber sealing cap 46 closes off a head mounting bracket 50, shown in FIG. 6 from the elements and is necessary for the aesthetics of the assembly. It is slightly different in shape from the mullion synthetic rubber sealing cap 14 but serves the same purpose and function.

Figure 3:
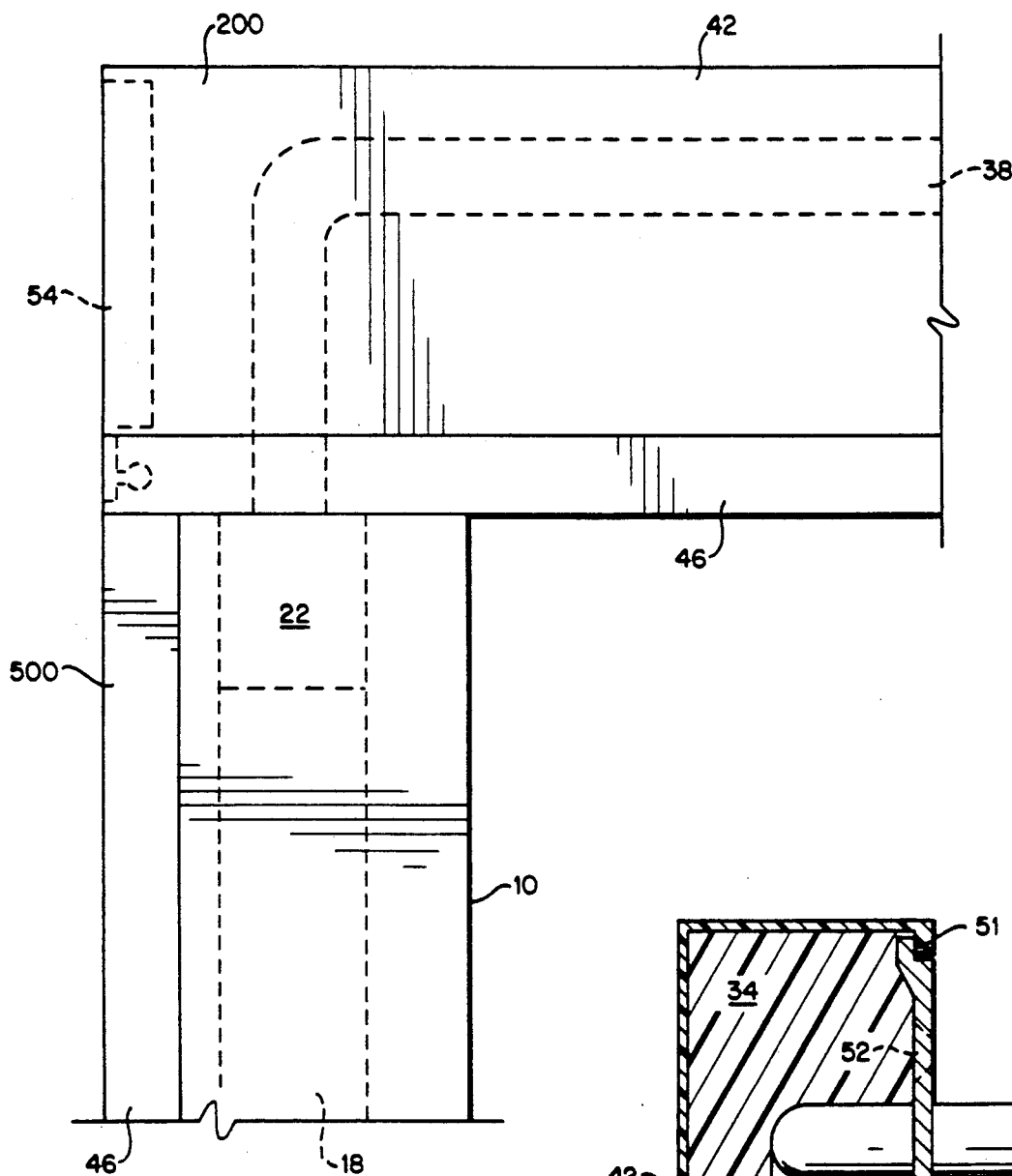
FIG. 3 is an exterior elevational view of the top of the left jamb assembly of FIG. 1 (head and sill assemblies are similar).

FIG. 3 shows the head assembly 200 near the jamb assembly 500. The head assembly 200 comprises a plastic head cap 54, that closes off the end of the head assembly 200. The jamb assembly 500 comprises a plastic cover 10, that houses slotted tubing 18, a self-leveling one-way pressure valve 22, polystyrene insulation 34, and a strip nozzle 30 (all as shown in FIG. 5).

Figure 4:
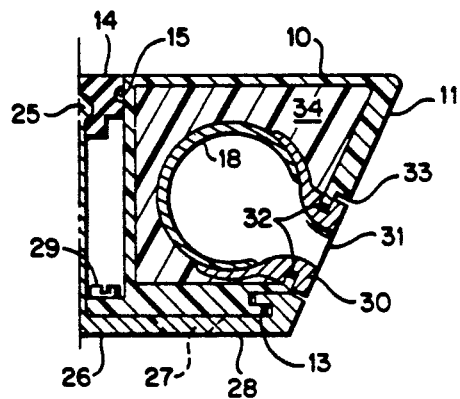
FIG. 4 is a cross-sectional view of one half of the mullion assembly through the line 4—4 of FIG. 1, the other half being a mirror image thereof.

FIG. 4 shows half of the mullion assembly 400, in cross-section along the line 4—4 of FIG. 1. It consists of a mullion mounting bracket 28, that is attached to a window mullion with screws through holes 27. The plastic cover 10, locks in place at a groove 13 in the mounting bracket 28, and is held in place with fastening screws 29. A strip nozzle 30, fits into the plastic cover 10 through grooves 32, in the strip nozzle 30. This allows for a variety of jet arrangements and sizes in the assembly. The slotted tubing 18 is bonded to the strip nozzle 30 with adhesive prior to installation. This arrangement allows for a variety of slotted tubing sizes to be used. The slotted tubing and strip nozzle assembly is protected from exterior elements by the polystyrene insulation 34. The plastic cover 10, is angled to provide a deflecting surface 11, to recirculate the vented air over the window area. Only one side of the mullion assembly 400, is illustrated here for simplicity. With both sides in place, the mullion synthetic rubber sealing cap 14 is snapped onto the mounting bracket center ridge 25. The weather grooves 15 prevent moisture and air from penetrating the assembly, and make a firm seal to the plastic covers 10.

Figure 5:
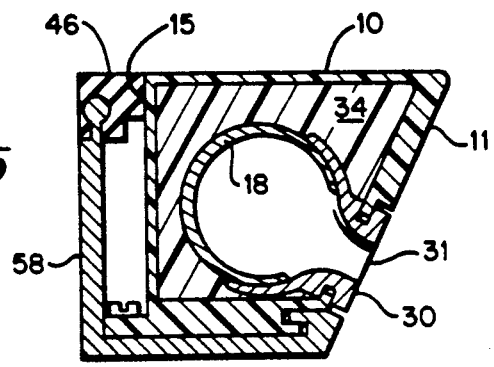
FIG. 5 is a cross-sectional view of the jamb assembly through the line 5—5 of FIG. 1.

FIG. 5 illustrates the jamb assembly 500 in cross-section along the line 5—5 of FIG. 1. The slotted tube 18, strip nozzle 30, insulation 34, and plastic cover 10 are similar in form and assembly to those illustrated in FIG. 4. The jamb mounting bracket 58, is designed differently for a single strip nozzle assembly, as is the jamb synthetic rubber sealing cap 46. Function and installation of the assembly is identical to the mullion assembly 400, illustrated in FIG. 4.

Figure 6:
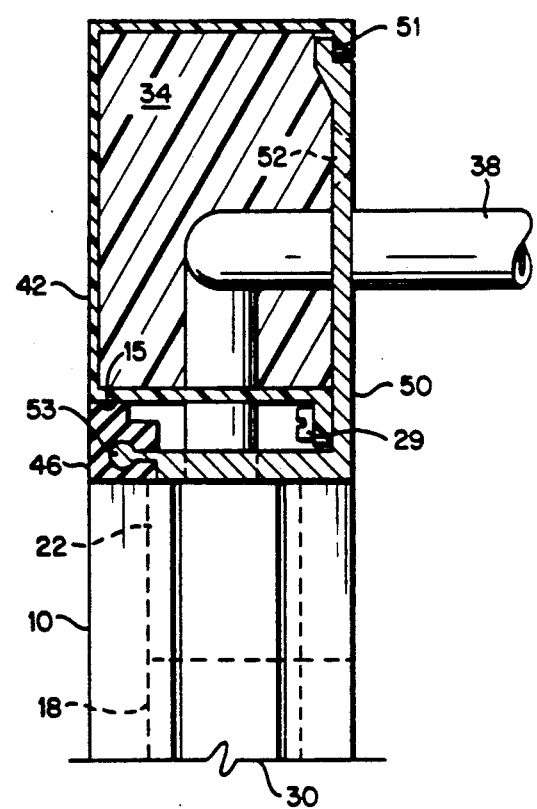
FIG. 6 is a cross-sectional view of the head assembly through the line 6—6 of FIG. 1

FIG. 6 is a cross-section of the head assembly 200 along the line 6—6 if FIG. 1. It comprises a mounting bracket 50 having an edge lip 51 and a center ridge 53 attached to the window head with screws through holes 52. A head plastic cover 42 hooks onto the edge lip 51 at one end. The other end of the head plastic cover 42 is fastened to the mounting bracket 50 with fasteners 29. The head plastic cover 42 houses air supply tubes 38, that are protected from the exterior elements by polystyrene insulation 34. A synthetic rubber sealing cap 46 snaps onto the center ridge 53, and weather grooves 15 in the sealing cap 46 prevent moisture and air from penetrating the assembly.

The air supply tubes 38, penetrate through the assembly mounting brackets at the jambs and mullions, as shown in FIGS. 2, 3 and 6. The other end of the air supply tubes 38, penetrate the wall or window jamb assembly, and are connected to a centrifugal fan of conventional design (not shown) located at the structure's interior, or are part of the exhaust air ducts (or grill assembly) in the H.V.A.C. system. Ventilated air is drawn into the centrifugal fan, through the air supply tubes 38 to the slotted tubing 18, and is exhausted through the jets 31, shown in FIGS. 4, 5, 8 and 10, across the exterior of the window surface. Generally, the head assembly 200 would not include strip nozzles or slotted tubing, unless a specific application demands it.

Figure 7:
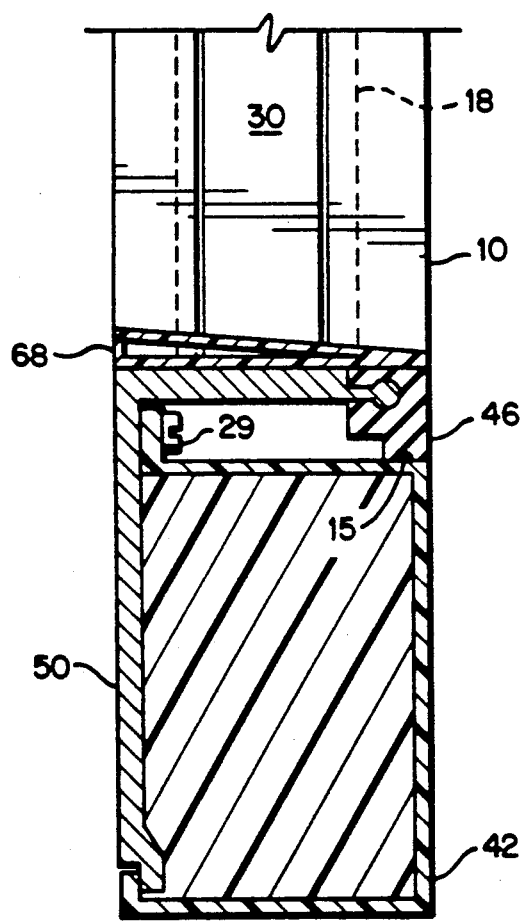
FIG. 7 is a cross-sectional view of the sill assembly through the line 7—7 of FIG. 1.

FIG. 7 is a cross-section of the sill assembly 300 along the line 7—7 of FIG. 1. Parts 50, 42, 46, and 29 are identical to those parts illustrated in FIG. 8 of the head assembly 200. The air supply tubing 38, and polystyrene insulation 34, are generally omitted from the sill assembly 300, unless a specific application dictates the need. This is true for the strip nozzle 30, and slotted tubing 18, in the assembly also. Unique to the sill assembly 300, is the sill camber 68. It is a separate piece with a 5 degree slant, installed to prevent water from accumulating on the sill.

Figure 8:
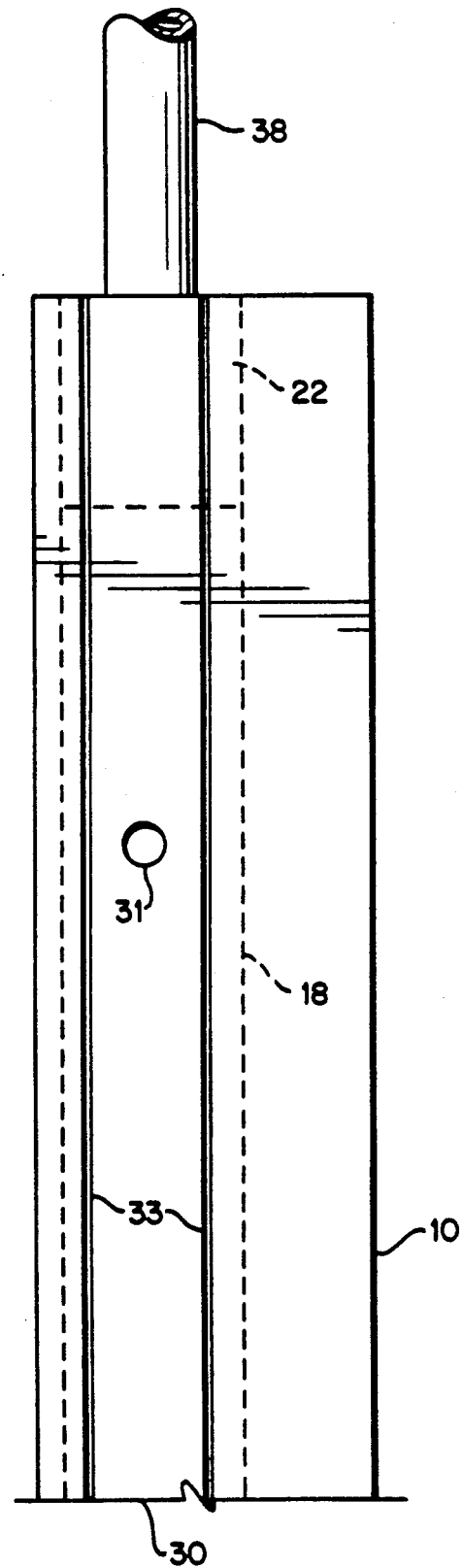
FIG. 8 is a side elevational view of a jamb or mullion assembly.

FIG. 8 illustrates the strip nozzle 30 in elevation view as part of a jamb assembly 500 or a mullion assembly 400. Only one of the jets 31, through which the vented air is passed, is illustrated for simplicity. Obviously, it is preferred that each strip nozzle 30 be provided with a plurality of jets 31. Expansion grooves 33, allow for the expansion or contraction of the assembly cover 10, and strip nozzle 30. The air supply tubes 38, are shown where they enter the assembly at the self-leveling one way pressure valve 22, shown in FIG. 11.

Figure 9A:
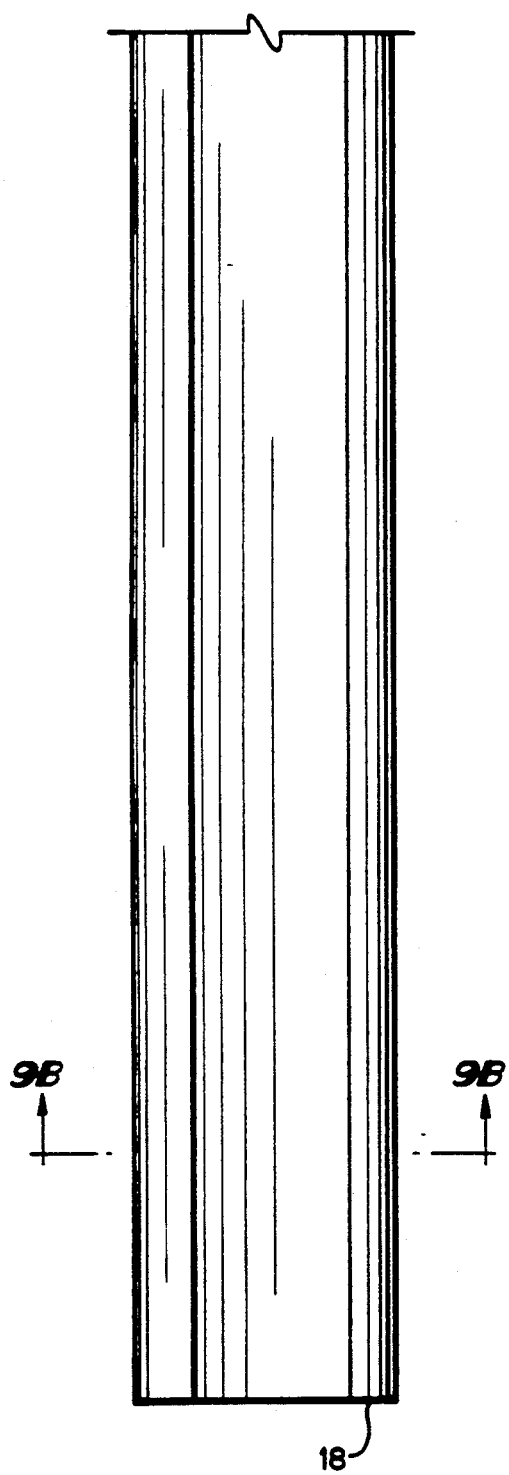
FIG. 9A is a side view of a section of slotted tubing 18.
Figure 9B:
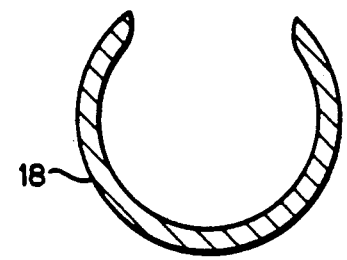
FIG. 9B is an end view of the slotted tubing through the line 9B—9B in FIG. 9A.
Figure 9C:
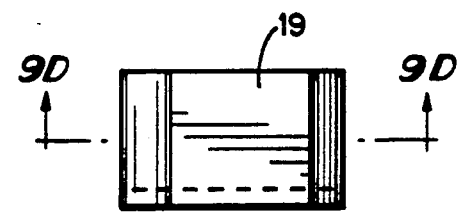
FIG. 9C is a side view of a tubing cap 19.
Figure 9D:
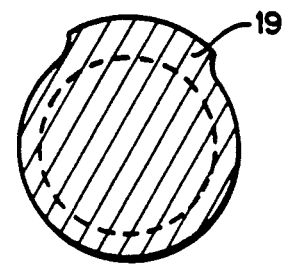
FIG. 9D is an end view of the tubing cap through the line 9D—9D of FIG. 9C.

FIGS. 9A and 9B show side and end views of the slotted tubing 18. A variety of sizes will accommodate a variety of applications and demands. Plastic is suitable for low pressure applications, but other materials can be substituted depending on the design conditions. The slotted tubing 18, is capped off on one end with a tubing cap 19 (shown in FIGS. 9C and 9D), which is bonded to the slotted tubing 18, with adhesive prior to installation.

Figure 10A:
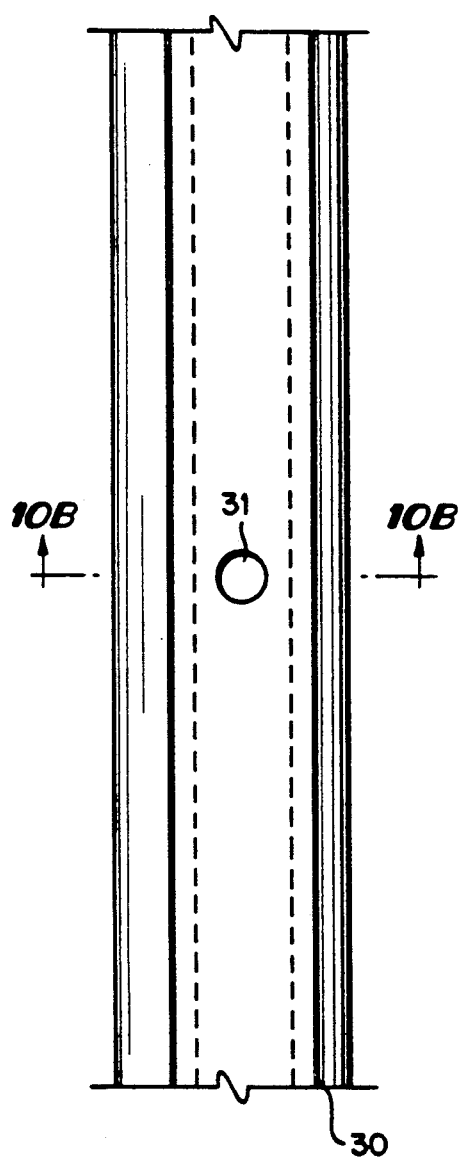
FIG. 10A is an exterior elevational view of the strip nozzle.
Figure 10C:
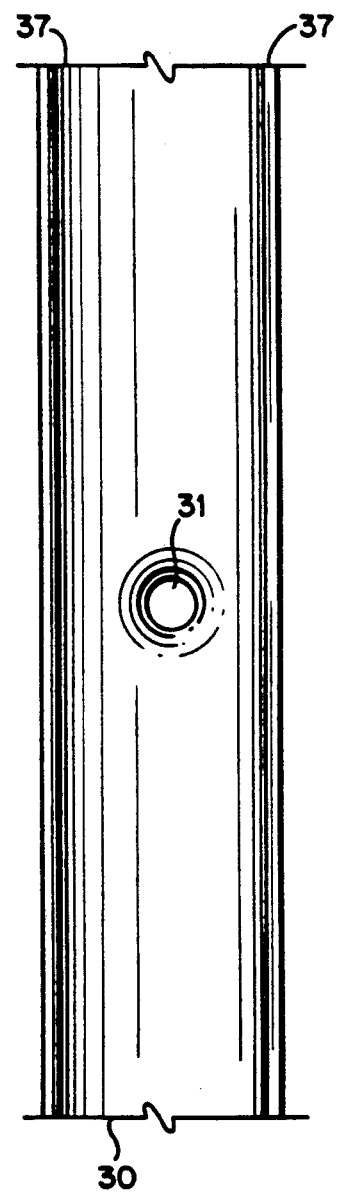
FIG. 10C is an interior elevational view of the strip nozzle along the line 10C—10C of FIG. 10B.
Figure 10B:
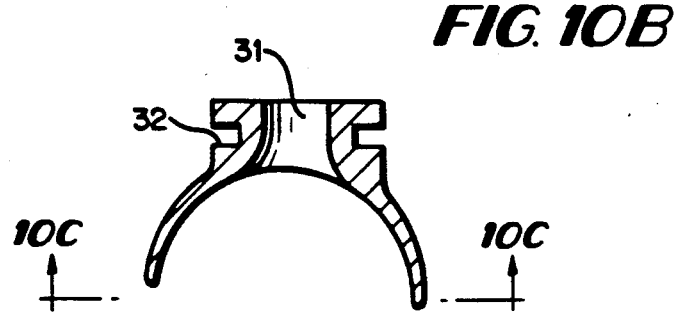
FIG. 10B is an end view of the strip nozzle along the line 10B—10B of FIG. 10A.

FIGS. 10A, 10B and 10C show the strip nozzle 30, again with only one jet 31 shown for simplicity. FIG. 10A is a front elevational view showing the jet 31, FIG. 10B is a cross sectional view showing the strip grooves 32 that lock into the plastic cover 10, and FIG. 10C is an interior view along the line 10C—10C of FIG. 10B. The interior edges 37 of the strip nozzle 30 are to be bonded to the exterior edges of slot in the slotted tubing 18, preferably with adhesive, in order to create an airtight unit before assembly. Separately manufacturing the strip nozzles and slotted tubing and then bonding them together allows for a variety of nozzle designs to be used for different applications. Of course, the strip nozzles and slotted tubing also could be integrally formed, resulting in a nozzle tube having a plurality of spaced transverse air jets.

Figure 11A:
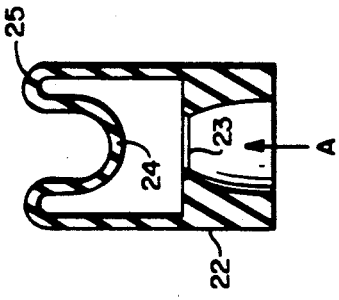
FIG. 11A is an end view of the pressure valve 22 along the line 11A—11A of FIG. 2.
Figure 11B:
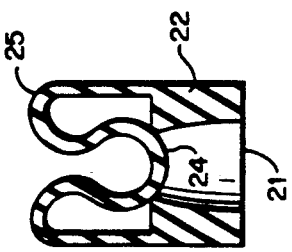
FIG. 11B is a view of the pressure valve 22 in the closed position along the line 11B—11B of FIG. 11A.
Figure 11C:
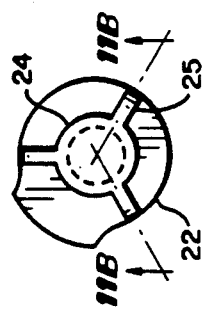
FIG. 11C is a view of the pressure valve 22 in the open position along the line 11B—11B of FIG. 11A.

FIGS. 11A, 11B and 11C show the self-leveling one-way pressure valve 22, which allows vented air to enter the slotted tubing 18 from the air supply tubes 38, but prevents a reversal of this air flow. FIG. 11A is an end view of the valve 22 showing the inlet port cap 24 and the extended levelers 25. The levelers 25 are configured to close the inlet port cap 24 when there is no air flowing out of the air supply tubes 38 or when the pressure in the slotted tubing 18 is greater than the pressure in the air supply tubes 38, which could be caused by, for example, gusts of air. FIG. 11B illustrates the valve in the closed position and FIG. 11C illustrates the valve 22 in the open position. Of course, other valves of conventional design could be employed instead.

It is preferred to provide a transition duct (not shown) between the fan and the air supply tubes because the diameter of the tube probably will be smaller than the diameter of the fan and because one fan can be used in conjunction with a plurality of air supply tubes. The size and configuration of the transition duct would vary depending on the size and configuration (round, square, oval, etc.) of the air supply tubes and the number of air supply tubes serviced by the fan.

It is further preferred to provide a damper in the transition duct connected to the control unit to control pressure/flow characteristics, so that if the one way pressure valve 22 is closed, the air will be ventilated through the normal outflow channels.

Figure 12:
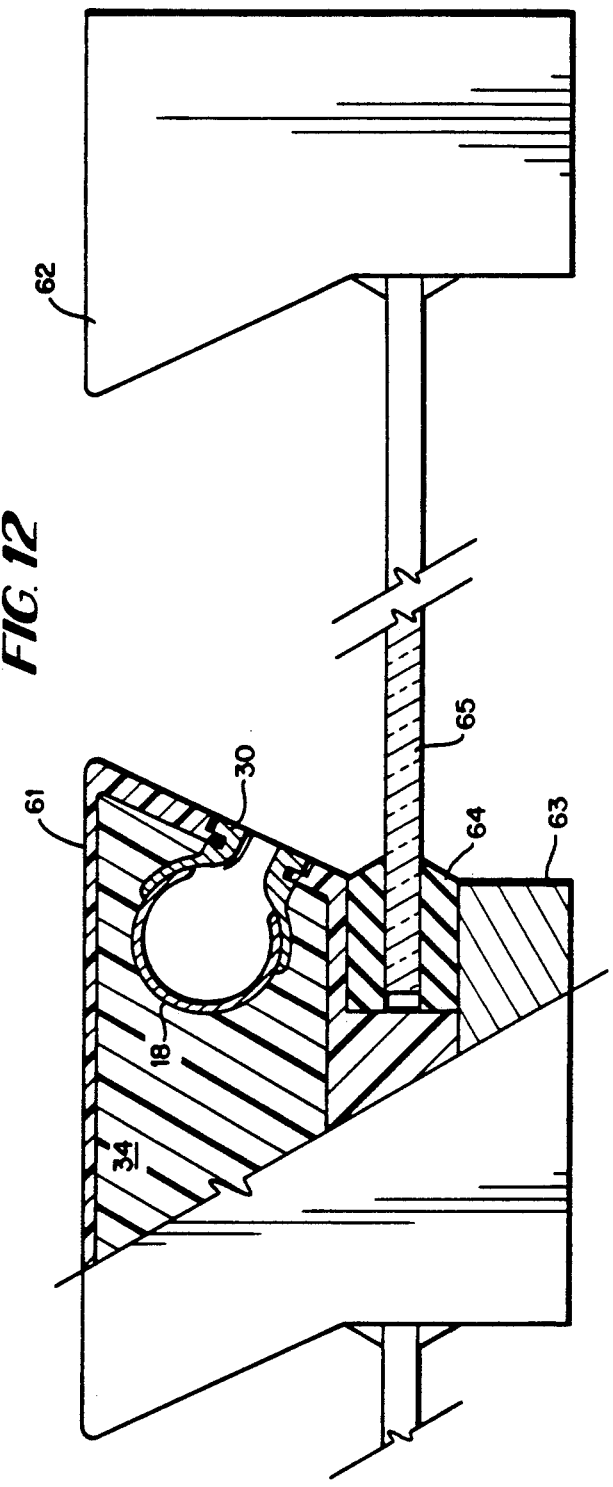
FIG. 12 is an end view of an alternative embodiment of the invention.

FIG. 12 illustrates an alternative embodiment, in which the strip nozzle 30, slotted tubing 18 and polystyrene insulation 34 are integrally formed into an entire window jamb assembly 62 or mullion assembly 61, instead of being retrofitted. In this embodiment, the glass 65 also has seals 64 and stops 63.

The invention has been disclosed with respect to particular preferred embodiments. It will be apparent to those in the art that many modifications and alterations can be made to the disclosed embodiments without departing from the spirit or scope of the invention. For example, the air supply tubing and slotted tubing can be of any cross section, not just round. For a further example, the strip nozzle and the slotted tubing can be integrally formed into a tube having air jet apertures. For a still further example, the control unit could be merely a switch. For a still further example, the air jet apertures could be located at the corners of the windows and could direct air diagonally across the window. For an even further example, the air jets need not be aligned and transverse and the air supply tubes and nozzle tubes could be integrally formed. Moreover, the air jet apertures could be located in or on any part or parts of the window frame, including the head and the sill. Accordingly, no limitations are to be inferred or implied except as specifically set forth in the appended claims.

What is claimed is:

1. An improved window for an interior space containing air at an interior temperature in a building, said window having an exterior pane with an exterior face and an interior face, and a frame having a head, a sill, and jambs, comprising:
    an elongated nozzle tube having a plurality of air jet apertures spaced along its length attached to said frame, said air jet apertures being configured to direct said air onto said exterior face of said pane;
    an air supply tube communicating with said interior space attached to one end of said nozzle tube;
    ventilating means for ventilating air from said interior space into said air supply tube, whereby air from said interior space is ventilated at said interior temperature into said air supply tube and through said nozzle tube and is directed by said air jet apertures onto said exterior face to circulate air adjacent to said exterior face in a controlled circulation pattern, wherein:
    said nozzle tube comprises:
    an elongated tube having a slot along at least a portion of its length; and
    an elongated nozzle strip having a plurality of substantially aligned air jet apertures spaced along its length bonded to said slotted tube with said air jet apertures aligned along said slot.

2. An improved window, according to claim 1, wherein said ventilating means comprises a centrifugal fan located in said interior space.
3. An improved window, according to claim 1, wherein said ventilating means comprises a centrifugal fan placed in an exhaust duct of a heating, ventilating and air conditioning system for said interior space.
4. An improved window, according to claim 1, wherein said ventilating means comprises a return air fan in an exhaust duct of a heating, ventilating and air conditioning system for said interior space.
5. An improved window, according to claim 1, wherein said air supply tube is mounted on said frame.
6. An improved window, according to claim 1, wherein said nozzle tube and said air supply tube are integrally formed.
7. An improved window, according to claim 1, further comprising:
    a one-way valve interposed between said air supply tube and said nozzle tube.
8. An improved window, according to claim 1, wherein said window has only one pane.
9. An improved window, according to claim 1, further comprising:
    insulation disposed around said air supply tube.
10. An improved window, according to claim 1, wherein said nozzle tube is attached to one of said jambs.
11. An improved window, according to claim 1, wherein said nozzle tube is attached to said head.
12. An improved window, according to claim 1, wherein said nozzle tube is attached to said sill.
13. An improved window, according to claim 1, further comprising:
    a mullion approximately bisecting said frame;
    an elongated mullion nozzle tube having a plurality of aligned transverse mullion air jet apertures spaced along its length attached to said mullion, said mullion air jet apertures being configured to direct air onto said exterior face of said pane; and
    a mullion air supply tube communicating with said interior space attached to one end of said mullion nozzle tube.
14. An improved window, according to claim 1, wherein:
    said air is ventilated from said interior at a rate less than or equal to approximately one cubic foot per minute for each square foot of said pane.
15. An improved window, according to claim 1, wherein said air is directed perpendicularly from one of said jambs towards the other, almost parallel to but towards said exterior face.
16. An improved window, according to claim 1, wherein:
    said jambs and mullions are canted to define air deflecting surfaces to resist disruption of said ventilated air by ambient air movement.

* * * * *